United States Patent
Schober

(10) Patent No.: US 9,143,851 B2
(45) Date of Patent: Sep. 22, 2015

(54) MICROPHONE ARRANGEMENT

(75) Inventor: Armin Schober, Munich (DE)

(73) Assignee: EPCOS AG, Munich (DE)

( * ) Notice: Subject to any disclaimer, the term of this patent is extended or adjusted under 35 U.S.C. 154(b) by 642 days.

(21) Appl. No.: 13/289,862

(22) Filed: Nov. 4, 2011

(65) Prior Publication Data

US 2012/0114145 A1    May 10, 2012

(30) Foreign Application Priority Data

Nov. 4, 2010  (DE) .......................... 10 2010 050 472

(51) Int. Cl.
*H04R 3/00*  (2006.01)
*H04R 1/10*  (2006.01)
*H04M 1/03*  (2006.01)
*H04M 1/60*  (2006.01)

(52) U.S. Cl.
CPC ............... *H04R 1/1016* (2013.01); *H04M 1/03* (2013.01); *H04M 1/6058* (2013.01)

(58) Field of Classification Search
CPC ...... H04R 3/00; H04R 2420/09; H04S 1/005; G10K 2210/1081
USPC ................................ 381/122, 74, 91, 92, 369
See application file for complete search history.

(56) References Cited

U.S. PATENT DOCUMENTS

| | | | |
|---|---|---|---|
| 5,051,799 A * | 9/1991 | Paul et al. ...................... | 375/242 |
| 7,929,714 B2 * | 4/2011 | Bazarjani et al. ............. | 381/111 |
| 2008/0013747 A1 | 1/2008 | Tran | |
| 2009/0319260 A1 | 12/2009 | Kong et al. | |
| 2010/0119099 A1 * | 5/2010 | Haupt et al. ................... | 381/369 |
| 2013/0221457 A1 * | 8/2013 | Conti et al. .................... | 257/416 |

FOREIGN PATENT DOCUMENTS

| | | |
|---|---|---|
| DE | 10 2005 042 904 B4 | 10/2007 |
| EP | 1 364 555 B1 | 5/2005 |
| WO | WO 2009/091660 A1 | 7/2009 |

OTHER PUBLICATIONS

ELEKTOR.de, "MEMS Microphone with Good Sound Quality; New SMD Microphone Improves the Sound Quality in Mobile Devices," Elektor [Online], URL: http://www.elektor.de/elektronik-news/mems-mikrofon-mit-gutem-klang.699568.lynkx, Oct. 3, 2008, 2 pages.

(Continued)

*Primary Examiner* — Vivian Chin
*Assistant Examiner* — Ammar Hamid
(74) *Attorney, Agent, or Firm* — Slater & Matsil, L.L.P.

(57) ABSTRACT

A microphone arrangement has an SMD housing with a sound inlet opening. A transducer receives sound waves through the sound inlet opening and converts the received sound waves into electrical signals. An analog-to-digital converter provides digital signals. An interface control unit with a digital interface is used by the chip to transmit data serially to an external device. At least one further interface is connected to a peripheral device such that the at least one further interface can be used to transmit data between the peripheral devices and the interface control unit. The transducer, the analog-to-digital converter, the interface control unit and the at least one further interface are integrated in the SMD housing.

21 Claims, 7 Drawing Sheets

(56) References Cited

OTHER PUBLICATIONS

EPCOS AG, "MEMS Microphones for Improved Sound Quality; Big Impact in a Small Package," Components; The Customer Magazine of TDK-EPC Corporation, URL: http://www.epcos.de/web/generator/Web/Sections/Components/Applications/2010/01_MEMS_microphones/MEMS_microphones.templated=renderPDF,locale=nn. pdf, Oct. 2010, 10 pages.

ADI, "Omnidirectional Microphone with Bottom Port and Digital Output; ADMP421," Analog Devices, Inc., Datasheet, URL: http://www.analog.com/static/imported-files/data_sheets/ADMP421.pdf, Nov. 2011, 16 pages.

ADI, "ADMP421: iMEMS® Microphone Omni Directional Microphone with Bottom Port and Digital Output," Analog Devices, Inc., Audio/Video Products, URL: http://www.analog.com/en/audiovideo-products/imems-microphone/admp421/products/product.html, Nov. 2011, 2 pages.

* cited by examiner

MICROPHONE ARRANGEMENT

This application claims priority to German Patent Application 10 2010 050 472.6, which was filed Nov. 4, 2010 and is incorporated herein by reference.

TECHNICAL FIELD

The invention relates to a microphone arrangement which has a transducer for converting sound waves into analog signals and can accordingly be used as a microphone.

BACKGROUND

Various microphones that can be connected to an external device, for example, to a mobile telephone or to a computer are known. Such a microphone may be part of a headset, for example. Often, further peripheral devices besides the microphone need to be connected to the external device. If a headset with a microphone is connected to a mobile telephone, for example, it is also possible to connect an input device, which allows the volume to be adjusted, for example, to the central device. Peripheral devices can furthermore be connected to a central device together with a microphone for a wide variety of further functions. Examples in this regard are further microphones for noise reduction or cameras for video recording.

If a further peripheral device, for example, an input device, is connected to a headset with a microphone which is connected to an external device, there is then the problem of transmitting data from this peripheral input device to the central device.

A solution to this problem is disclosed in WO 2009/091660 A1. This document describes a headset with an input device which can be connected to a mobile telephone or a computer by means of a jack plug. Data transmission from the input device to the computer or the mobile telephone involves the use of the same signal channel as is also used for the data transmission from the microphone in the headset. To this end, the signals produced by the input device are converted into ultrasonic signals. These ultrasonic signals do not disturb the signals on the microphone, since they are imperceptible to human hearing. The solution to the aforementioned problem as disclosed in this document is very specific, however, and is suitable only for instances in which the signals from the peripheral device can be meaningfully converted into ultrasonic signals.

WO 2009/091660 A1 proposes using the signal channel of the microphone for the data transmission between the peripheral device and the central device. Various drawbacks arise in this context, however. Firstly, this requires the peripheral device to be equipped with complex switching logic, and secondly the signal channel of the microphone can be used to transmit only a limited number of signals. Particularly if the peripheral device is a mechanical device which does not have any semiconductor circuits, the implementation of an interface in the peripheral device is very complex.

A further solution to this problem is disclosed in the German publication DE 102005042904 B4. In this case, a microphone capsule is connected to a controller by means of a preamplifier and an analog-to-digital converter. The controller is in turn connected to an external device, e.g., a computer or a mobile telephone, by means of an interface. The controller is also connected to an input device which has a display and buttons. The input device communicates with the external device via the controller and the interface.

SUMMARY OF THE INVENTION

In one aspect, the present invention further miniaturizes a microphone arrangement, such as the one known from the German publication DE 102005042904 B4. Other aspects allow the transmission of data between an arbitrary number of peripheral devices and the external device. The German publication DE 102005042904 B4 is incorporated herein by reference.

The invention proposes a microphone arrangement in an SMD housing (SMD=Surface Mounted Device). The microphone arrangement has a sound inlet opening. A transducer receives sound waves through the sound inlet opening and converts the received sound waves into electrical signals. An analog-to-digital converter provides digital signals. An interface control unit with a digital interface can be used to transmit data serially to an external device. At least one further interface is connected to a peripheral device such that the at least one further interface can be used to transmit data between the peripheral device and the interface control unit. The transducer, the analog-to-digital converter, the interface control unit and the at least one further interface are integrated in the SMD housing. In an alternative refinement, only the transducer and the analog-to-digital converter are integrated in the SMD housing. In that case, the interface control unit and the at least one further interface are integrated in a second SMD housing.

The digital interface between the interface control unit and the external device allows for serial data transmission. This allows data to be transmitted from any number of peripheral devices to the external device by means of the interface control unit. It is accordingly possible to dispense with complex circuit logic for the peripheral devices.

Since the transducer and the analog-to-digital converter, and possibly also the interface control unit and the at least one further interface, are integrated in the SMD housing, it is possible to miniaturize the design of the microphone arrangement. Within the context of the present invention, the term microphone arrangement denotes an arrangement of components on a chip-like carrier substrate, which arrangement is integrated in an SMD housing. The microphone arrangement is accordingly an SMD component which can be integrated as a microphone into a headset, for example.

By contrast, the term "microphone" in German publication DE 102005042904 B4 denotes an entire microphone system. Within the context of the present invention, however, the term "microphone arrangement" denotes merely a combination of components, in an SMD housing, which together form a microphone. Accordingly, the term microphone capsule in German publication DE 102005042904 B4 corresponds to the subject matter of the present invention.

Preferably, the microphone arrangement also has a preamplifier for amplifying electrical signals from the transducer. The preamplifier can be arranged between the output of the transducer and the input of the analog-to-digital converter.

The microphone arrangement has at least one further interface for the connection of peripheral devices. The microphone arrangement can be connected to a multiplicity of different kinds of peripheral devices. The microphone arrangement can also simultaneously be connected to a plurality of peripheral devices. By way of example, these include electromechanical input devices in which a user can make inputs using a button or a rotating wheel. Accordingly, the interface control unit can preferably perform format conversions between a protocol for serial data transmission to the external device and a data format of such an electromechanical input device.

The further interfaces can also be used to connect the microphone arrangement to an electromechanical output device. These include loudspeakers, in particular. Again, the interface control unit can perform format conversions between the protocol for serial data transmission to the external device and a data format of this electromechanical output device.

The further interface can also have an optical output device connected to it. The interface control unit may be designed to perform format conversions between the protocol for serial data transmission and the data format of the optical output device. Examples of such an optical output device are light-emitting diodes.

In addition, the microphone arrangement can be used with an analog input and/or output device. Accordingly, the interface control unit can perform format conversions between the protocol for serial data transmission to the external device and a data format of the analog input and/or output device.

If the peripheral device is an input device, the input signals could be impedance-coded. In this case, the microphone arrangement should have an impedance detector which is positioned in the housing. The impedance detector is connected to the interface control unit and can be connected to the peripheral input device by means of a further interface of the chip. The impedance detector can recognize different impedance values and forward them to the interface control unit. The interface control unit should be able to perform format conversions between a protocol for serial data transmission to the external device and the impedance-coded data format of the peripheral device connected to the impedance detector.

The digital interface between the microphone arrangement and the external device is preferably USB, I2C, SPI, I2S or Slimbus. These interfaces allow serial data transmission. Accordingly, data from the microphone arrangement and from one or more peripheral devices can be transmitted to the external device in succession. Conversely, data from the external device can be sent to the microphone arrangement and to the peripheral devices likewise in succession. The serial nature of the data transmission does not, in principle, result in any limitation with respect to the number of simultaneously connectable peripheral devices.

The analog-to-digital converter is preferably a sigma-delta converter. The transducer, the analog-to-digital converter and/or the interface control unit may be monolithically integrated on a chip. In this case, the transducer is an MEMS structure. In addition, a preamplifier, an impedance detector, a digital-to-analog converter, an amplifier, a further preamplifier and/or a further analog-to-digital converter may be monolithically integrated on the chip.

The microphone arrangement according to the invention may either be incorporated in an external device and connected by means of a serial interface to the main board of the external device, or it may be integrated in a portable unit which can be connected to an external device.

Within the context of the present invention, it is also possible to split the microphone arrangement over a plurality of, preferably two, housings. A first SMD housing may contain a transducer, which produces electrical signals in accordance with the received sound waves, and an analog-to-digital converter. An interface connects the SMD housing to a further housing. The communication is effected using pulse density modulation (PDM) signals, for example. PDM is an output format which is customary for analog-to-digital converters, particularly sigma-delta converters. The amplitude of the analog signal is coded in the digital signal as the density of the pulses.

The further housing may have an integrated circuit integrated in it which has an interface control unit, a digital interface for communication with an external device, further interfaces for connecting peripheral devices and also further components.

This splitting of the microphone arrangement over two housings makes sense particularly when loudspeakers are connected to the integrated circuit. The integrated circuit can also be implemented together with the loudspeakers in one housing. The separation of the microphone arrangement into two housings allows isolation between microphone and loudspeakers.

BRIEF DESCRIPTION OF THE DRAWINGS

The invention is explained in more detail below with reference to exemplary embodiments and the associated figures. The figures use schematic illustrations, which are not to scale, to show various exemplary embodiments of the invention.

DETAILED DESCRIPTION OF ILLUSTRATIVE EMBODIMENTS

Figure 1:
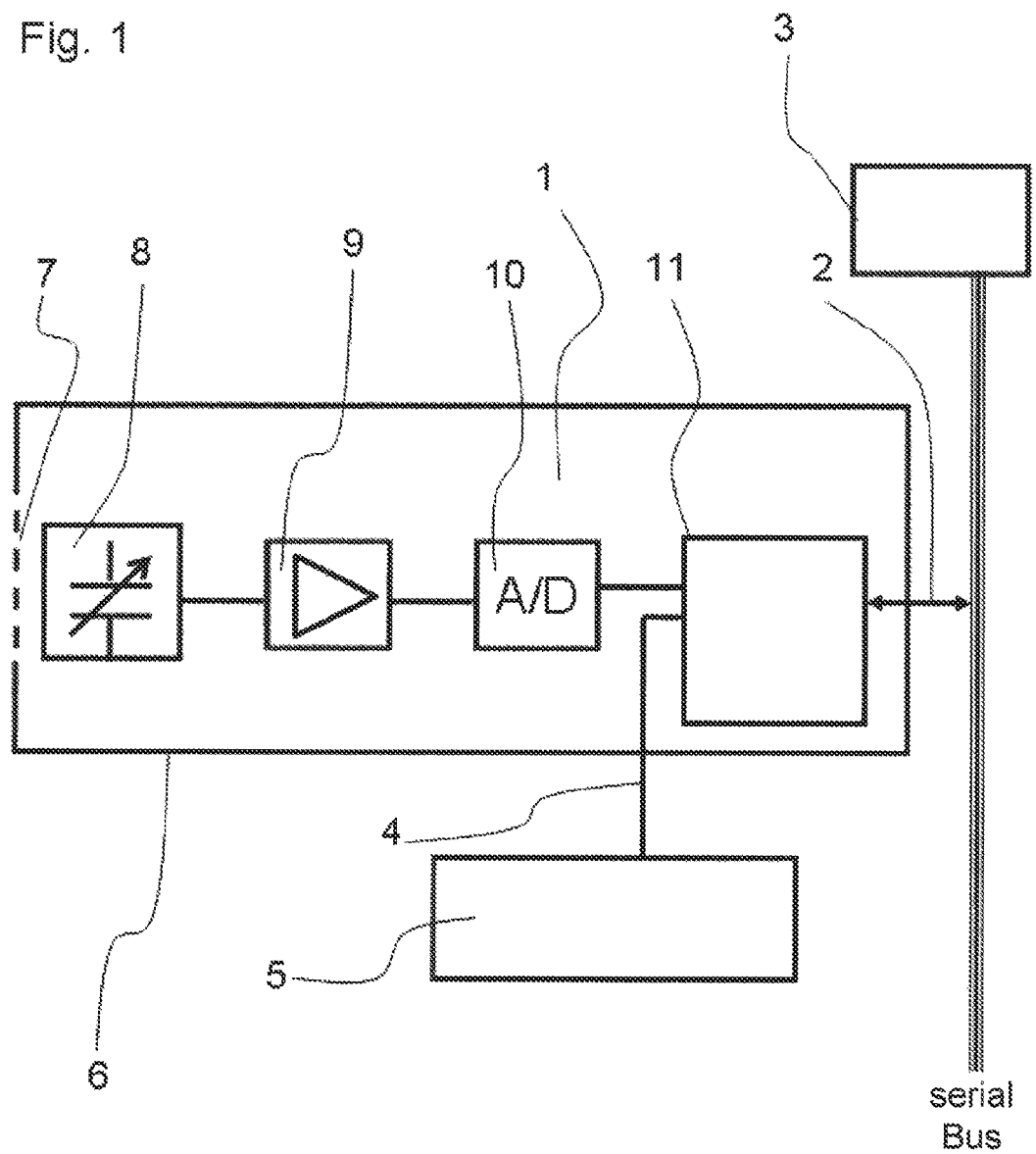
FIG. 1 shows a first exemplary embodiment of the microphone arrangement.

FIG. 1 shows a first exemplary embodiment of the microphone arrangement 1. The microphone arrangement 1 is connected to an external device 3 by means of a digital interface 2. In addition, the microphone arrangement 1 is connected to an input and output device 5 by means of a further interface 4. The microphone arrangement 1 has an SMD housing 6 with a sound inlet opening 7. In addition, the microphone arrangement 1 has a transducer 8 for receiving sound waves through the sound inlet opening 7 and for converting the received sound waves into electrical signals. This transducer 8 is a MEMS structure. The transducer 8 is connected to a preamplifier 9 which amplifies the electrical signals from the transducer 8. The preamplifier 9 is in turn connected to an analog-to-digital converter 10. The analog-to-digital converter 10 digitizes the analog signals produced by the first transducer 8. The microphone arrangement 1 also has an interface control unit 11 which is connected to the analog-to-digital converter 10. The transducer 8, the preamplifier 9, the analog-to-digital converter 10 and the interface control unit 11 are integrated in the SMD housing 6.

The microphone arrangement 1 also has a further interface 4. This interface is connected to the interface control unit 11. The interface has an input and output device 5 connected to it. By way of example, such an input and output device 5 may have buttons for input and a screen for output of data.

When a user inputs signals on this input and output device 5 by pushing buttons, these signals are forwarded to the interface control unit 11 by means of the further interface 4.

The interface control unit 11 routes the signals via the digital interface 2 to the external device 3.

If, conversely, data need to be routed from the external device 3 to the output unit of the input and output device 5, these data are first of all forwarded to the interface control unit 11 by means of the digital interface 2. The interface control unit 11 routes the data via the further interface 4 to the input and output device 5.

This requires the interface control unit 11 to be in control of both the protocol for the serial data transmission via the digital interface 2 to the external device 3 and the data format of the input and output device 5. In addition, the interface control unit 11 is able to perform format conversions between these two formats.

Figure 2:
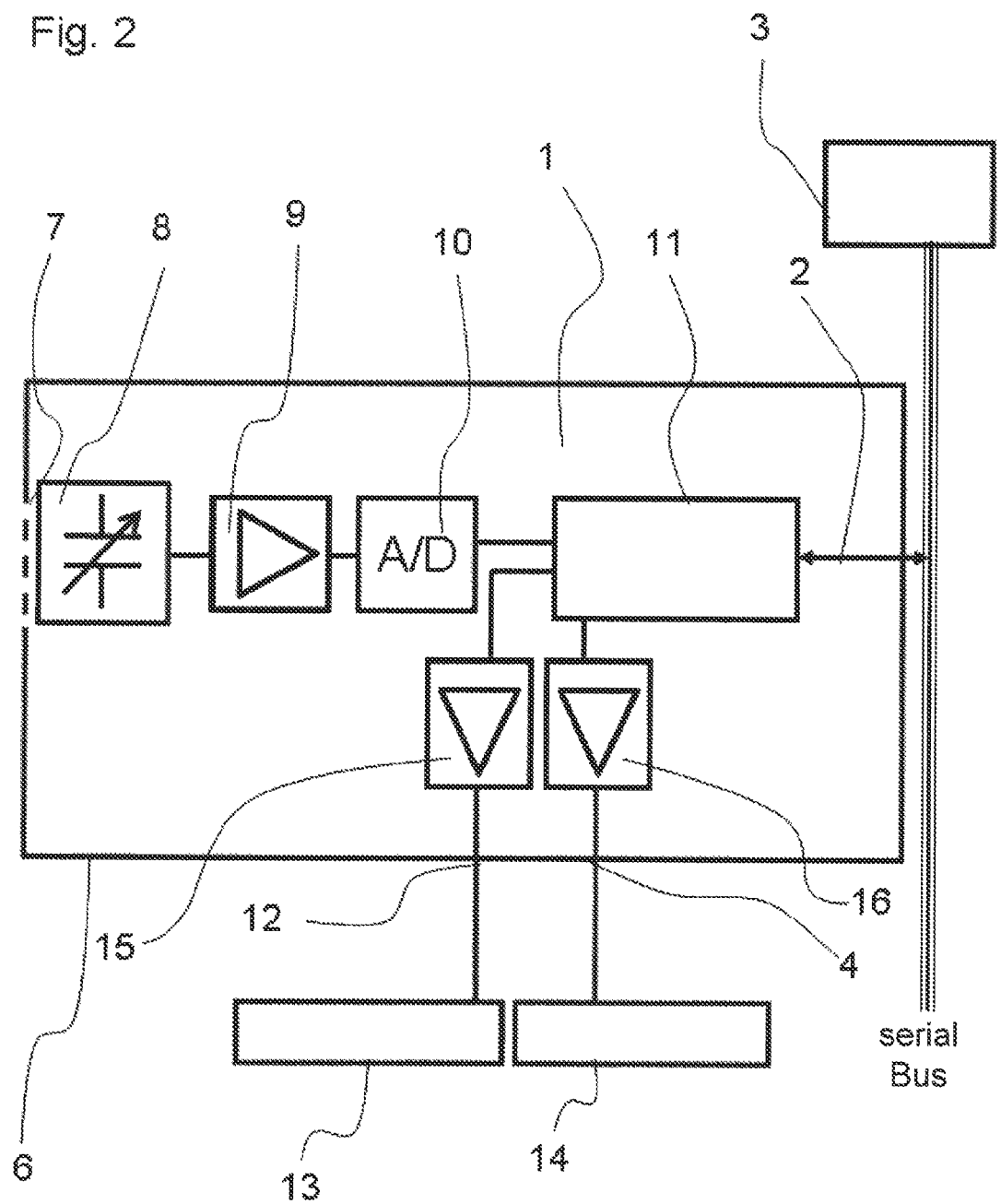
FIG. 2 shows a second exemplary embodiment of the microphone arrangement.

FIG. 2 shows a second exemplary embodiment of the microphone arrangement 1. The second exemplary embodiment differs from the first exemplary embodiment in that the microphone arrangement 1 now has two further interfaces 4, 12 for the connection of peripheral devices 13, 14 instead of a single one. The two further interfaces 4, 12 are each connected to the interface control unit 11 by means of a respective amplifier 15, 16.

Each of the two further interfaces 4, 12 has a respective output device, a loudspeaker 13, 14, connected to it. Serial data transmission can be used to route signals from the external device 3 via the digital interface 2 to the interface control unit 11 first of all and then to forward them from the latter via the two further interfaces 4, 12 to the loudspeakers 13, 14.

Figure 3:
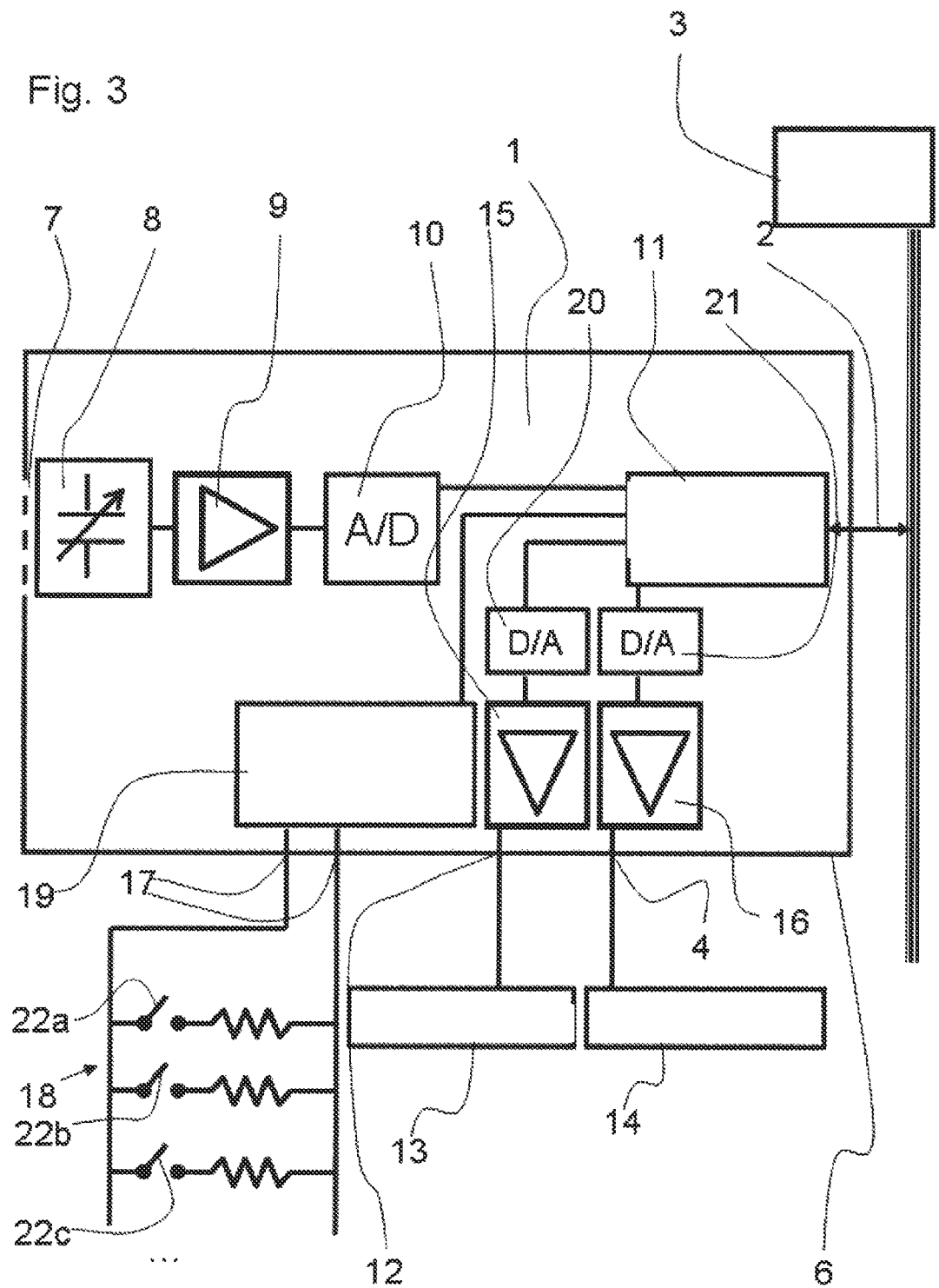
FIG. 3 shows a third exemplary embodiment of the microphone arrangement.

FIG. 3 shows a third exemplary embodiment of the microphone arrangement 1. According to this third exemplary embodiment, the microphone arrangement 1 has three interfaces 4, 12, 17 for the connection of peripheral devices 13, 14, 18. Each of these three further interfaces 4, 12, 17 is connected to the interface control unit 11. The first further interface 17 is connected to the interface control unit 11 by means of an impedance detector 19 which is arranged within the SMD housing 6. The second and third further interfaces 4, 12 are each connected to the interface control unit 11 by means of a digital-to-analog converter 20, 21 and a respective amplifier 15, 16.

Connected to the first interface as a peripheral device is an input device 18 which has switches 22a-22c. The user can operate the switches 22a-22c of this input device 18 by pushing buttons, for example.

In accordance with the switch position, a particular impedance value is set on the input device 18. This impedance value is applied to the impedance detector 19. The impedance detector 19 can distinguish between the different impedance values and forwards this information to the interface control unit 11. The interface control unit 11 can in turn perform format conversions between the data format of the serial data transmission to the external device 3 and the impedance-coded data format of the input device 18.

The second and third interfaces have a respective loudspeaker 13, 14 connected to them. The loudspeakers 13, 14 receive analog signals from the microphone arrangement 1. To this end, the digital signals from the interface control unit 11 are converted by means of the digital-to-analog converters 20, 21 into analog signals which are each additionally amplified by an amplifier 15, 16.

Figure 4:
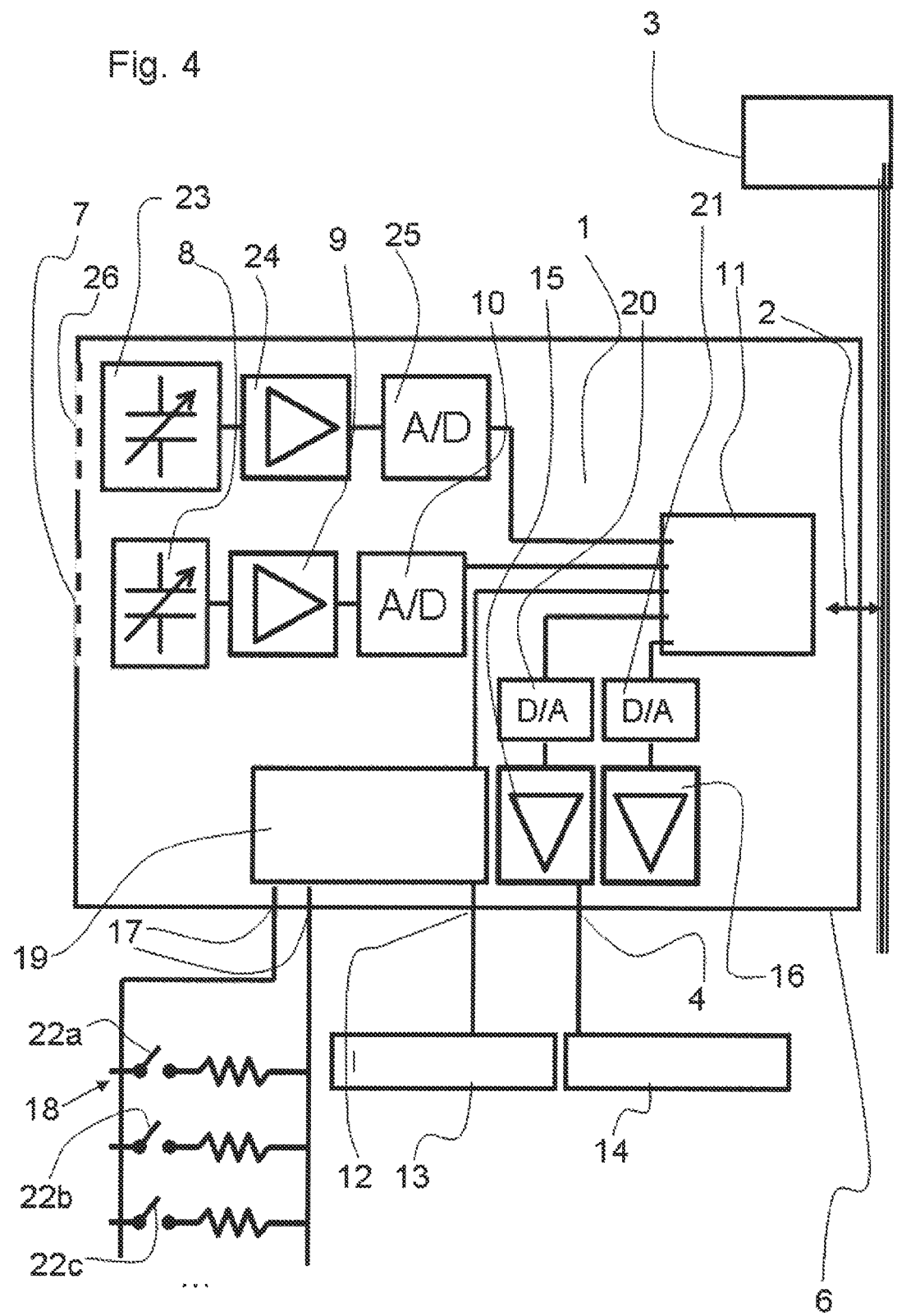
FIG. 4 shows a fourth exemplary embodiment of the microphone arrangement.

FIG. 4 shows a fourth exemplary embodiment of the microphone arrangement 1. This differs from the third exemplary embodiment in that the microphone arrangement 1 has a second transducer for converting received sound waves into electrical signals, a second preamplifier 24 and a second analog-to-digital converter 25. The transducer 23, the preamplifier 24 and the analog-to-digital converter 25 are connected to the interface control unit 11. In addition, a second sound inlet opening 26 is arranged in direct proximity to the second transducer 23.

Since the interface control unit 11 transmits its data to the external device 3 in serial form, a plurality of transducers 8, 23 for converting audio signals can be integrated into the microphone arrangement 1. This is not possible in the case of data transmission via a jack plug, as is customary in the prior art today. The use of a plurality of microphones which are combined to form a single microphone 1 allows noise reduction to be performed.

Figure 5:
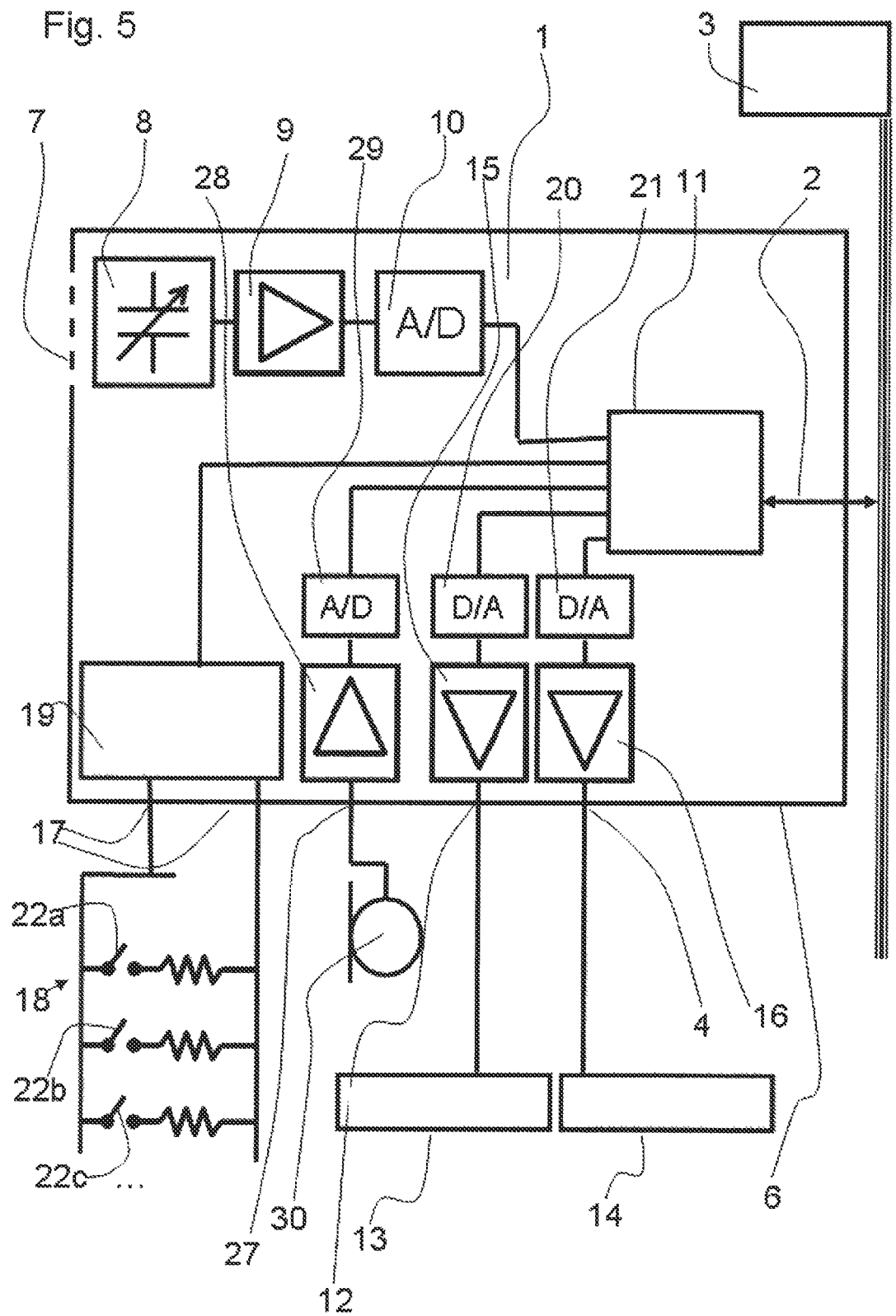
FIG. 5 shows a fifth exemplary embodiment of the microphone arrangement.

FIG. 5 shows a fifth exemplary embodiment of the microphone arrangement 1. The fifth exemplary embodiment differs from the third exemplary embodiment in that the microphone arrangement 1 has a further fourth interface 27 for the connection of a peripheral device. This fourth interface 27 is connected to the interface control unit 11 by means of a preamplifier 28 and an analog-to-digital converter 29. As a peripheral device, a further sound transducer 30 is connected to this interface. This sound transducer 30 serves as a second microphone and accordingly allows noise reduction to be performed.

The present invention accordingly allows an arbitrary number of peripheral devices 5, 13, 14, 18, 30 to be connected to a microphone arrangement 1 by means of interfaces 4, 12, 17, 27 and to an external device 3 by means of a digital interface 2 without the peripheral devices 5, 13, 14, 18, 30 having complex circuit logic. The number of simultaneously connectable peripheral devices 5, 13, 14, 18, 30 is now limited only by the number of further interfaces in the microphone arrangement 1.

Since now only a single interface control unit 11 is used for the communication between the peripheral devices 5, 13, 14, 18, 30 and the external device 3, there is no longer a need for a large number of circuit logic units and it is possible to save cost and space for the peripheral devices 5, 13, 14, 18, 30.

Figure 6:
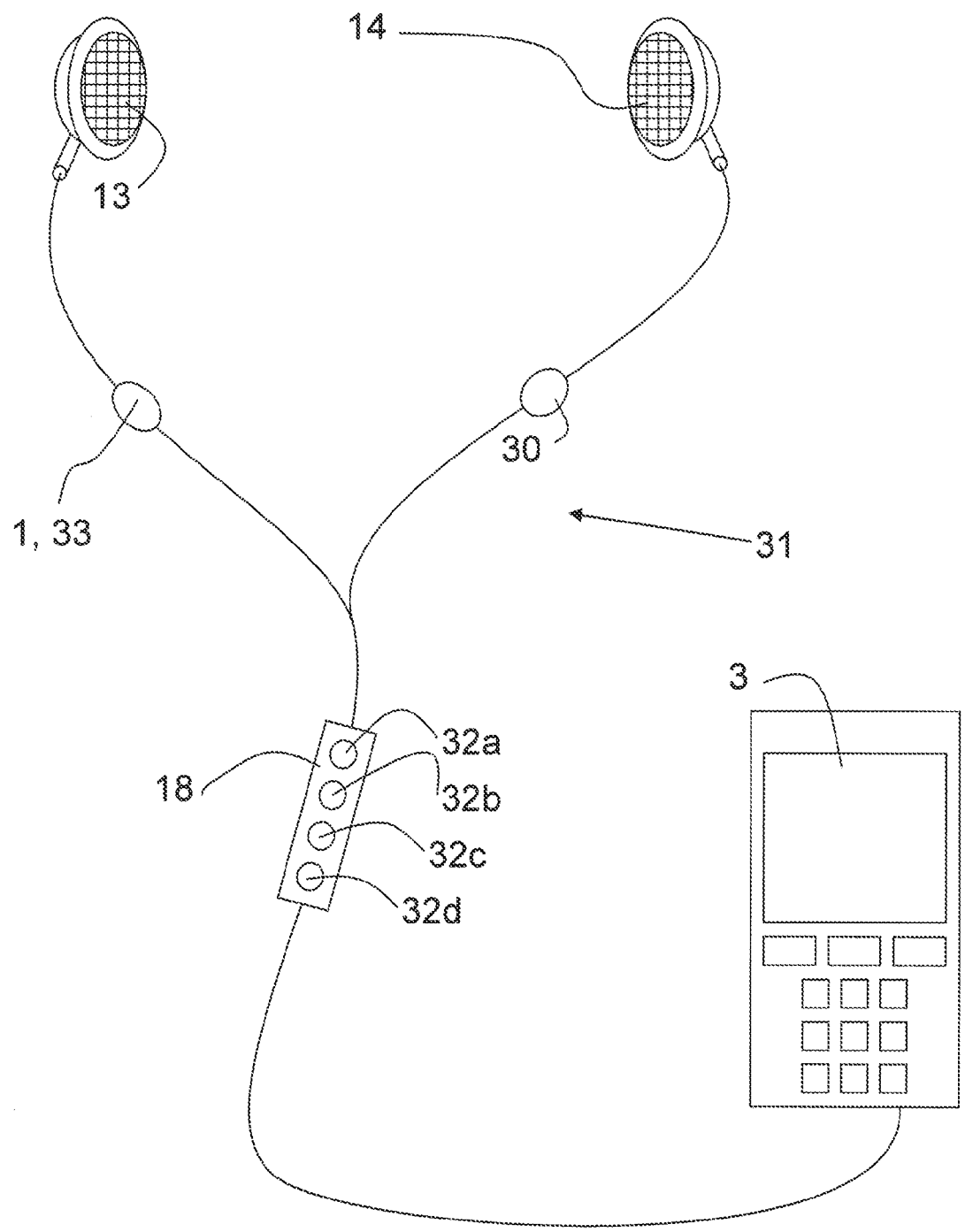
FIG. 6 shows a headset which has the microphone arrangement according to the invention integrated in it and in which further peripheral devices are connected to the microphone arrangement.

FIG. 6 shows a headset 31 in which a microphone arrangement 1 according to the invention is integrated. The microphone arrangement 1 is part of the first microphone 33. The headset 31 is connected to a mobile telephone 3. For the data transmission between the headset 31 and the mobile telephone 3, the digital interface 2 of the microphone arrangement 1 is used.

In addition, the first microphone 33 has a plurality of peripheral devices connected to it which are likewise integrated in the headset 31. These include two loudspeakers 13, 14, a second microphone 30 and an input device 18 with buttons 32a-32d. In order to allow the connection of the second microphone 30, the microphone arrangement 1 which forms the first microphone 33 may be designed as shown in FIG. 5 and have an interface which is connected to the interface control unit by means of an amplifier and an analog-to-digital converter.

Figure 7:
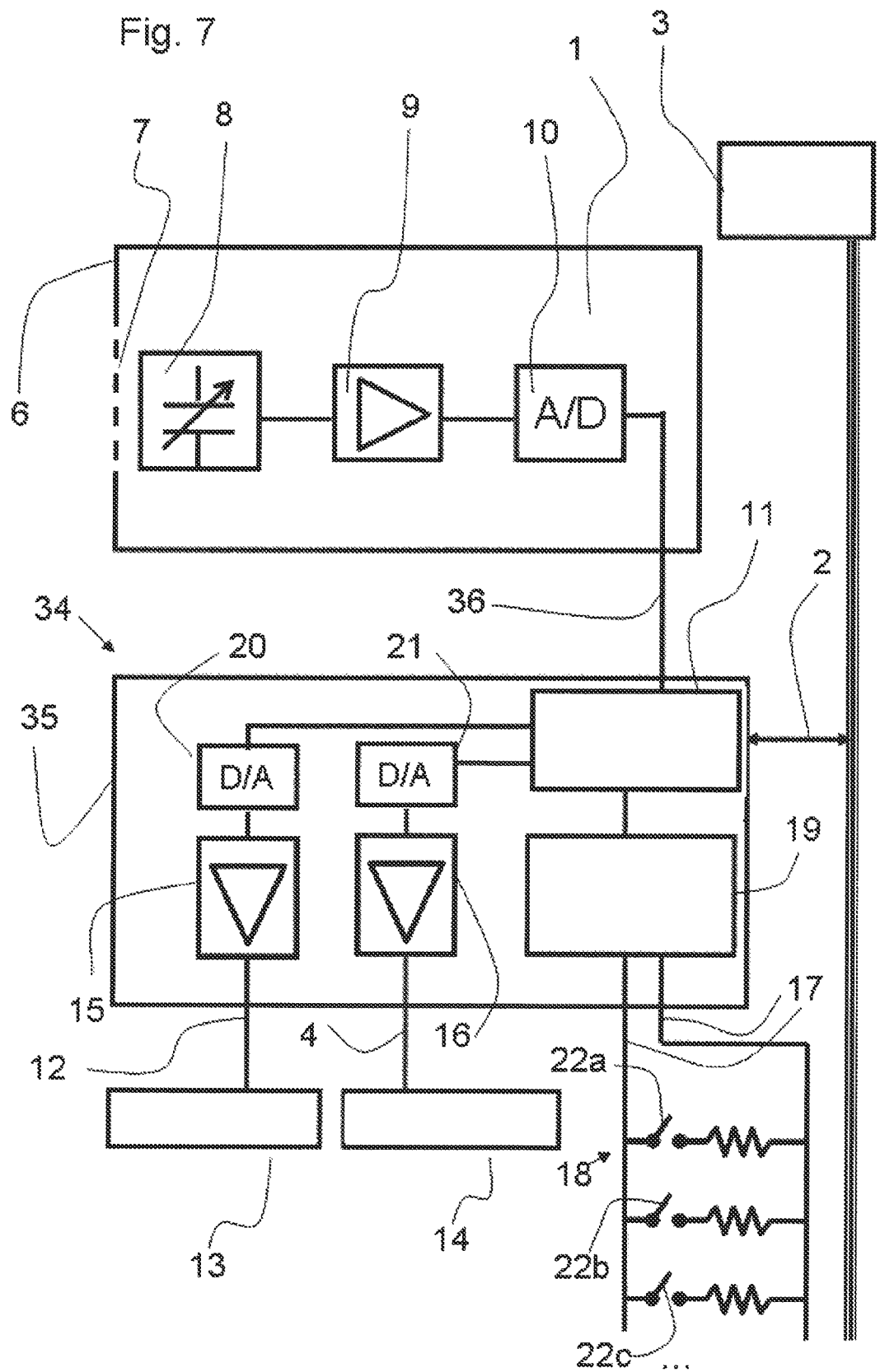
FIG. 7 shows a variant of the third exemplary embodiment of the microphone arrangement.

FIG. 7 shows a variant of the third exemplary embodiment in which some of the components are implemented on a separate integrated circuit 34. The separate integrated circuit 34 has the interface control unit 11 with the digital interface 2, and has the digital-to-analog converters 20, 21, the amplifiers 15, 16 and the impedance detector 19. This integrated circuit 34 is integrated in a housing 35.

An SMD housing 6 also has a sound inlet opening 7, a transducer 8 for converting the sound waves into electrical signals, a preamplifier 9 and an analog-to-digital converter 10. The SMD housing 6 and the integrated circuit 34 are interconnected by means of the interface 36.

The exemplary embodiments shown in FIGS. 1 to 5 each has a single SMD housing 6 in which the sound inlet opening 7, the transducer 8 for converting the sound waves into electrical signals, the preamplifier 9, the analog-to-digital converter 10, the interface control unit 11 and any further components are integrated. These exemplary embodiments are distinguished by a particularly compact, space-saving design. The components which are arranged in a common SMD housing may be monolithically integrated on a chip. Thus, particularly the transducer 8, the analog-to-digital converter 10, the interface control unit 11, the impedance detector 19, the digital-to-analog converter 20, 21, the amplifier 15, 16, the preamplifier 9, 24, 28 and/or the analog-to-digital converter 29 may be monolithically integrated on a chip.

In the exemplary embodiment shown in FIG. 7, the components are split over two housings 6, 35 which are connected by means of an interface 36. This may be advantageous particularly when components such as amplifiers 15, 16 or digital-to-analog converters 20, 21 can be assigned directly to a peripheral device, such as the loudspeakers 13, 14, and are arranged in a common housing with the loudspeakers 13, 14 and hence further away from the microphone 1. This minimizes reciprocal influencing of the microphone 1 and the loudspeakers 13, 14.

What is claimed is:

1. A microphone arrangement, comprising:
    an SMD housing;
    a sound inlet opening;
    a transducer that receives sound waves through the sound inlet opening and produces electrical signals that correspond to the received sound waves;
    an analog-to-digital converter for providing digital signals;
    an interface control unit with a digital interface that can be used to transmit data serially to an external device; and
    at least one further interface to which a peripheral device can be connected such that the at least one further interface can be used to transmit data between peripheral devices and the interface control unit,
    wherein the transducer, the analog-to-digital converter, the interface control unit and the at least one further interface are integrated in the SMD housing, or
    wherein the transducer and the analog-to-digital converter are integrated in the SMD housing and the interface control unit and the at least one further interface are integrated in a second SMD housing, wherein the microphone arrangement and the peripheral device are configured to transmit data to the external device serially and/or wherein the external device is configured to transmit data to the microphone arrangement and to the peripheral device serially, wherein the microphone arrangement is configured such that if data are transmitted from the external device to the peripheral device, the data are first of all forwarded to the interface control unit by means of the digital interface and the interface control unit routes the data via the further interface to the peripheral device.

2. The microphone arrangement according to claim 1, further comprising:
    a preamplifier for amplifying analog electrical signals from the transducer, wherein an input of the preamplifier is coupled to an output of the transducer, and wherein an output of the preamplifier is coupled to an input of the analog-to-digital converter.

3. The microphone arrangement according to claim 1, wherein the at least one further interface can have an electromechanical input device connected to it; and
    wherein the interface control unit can perform format conversions between a protocol for serial data transmission to the external device and a data format of the electromechanical input device.

4. The microphone arrangement according to claim 1, wherein the at least one further interface can have an electromechanical output device connected to it; and
    wherein the interface control unit can perform format conversions between a protocol for serial data transmission to the external device and a data format of the electromechanical output device.

5. The microphone arrangement according to claim 1, wherein the at least one further interface can have an optical output device connected to it; and
    wherein the interface control unit can perform format conversions between a protocol for serial data transmission to the external device and a data format of the optical output device.

6. The microphone arrangement according to claim 1, wherein the at least one further interface can have an analog input and/or output device connected to it; and
    wherein the interface control unit can perform format conversions between a protocol for serial data transmission to the external device and a data format of the analog input and/or output device.

7. The microphone arrangement according to claim 1, further comprising:
    an impedance detector positioned in the housing and coupled to the interface control unit wherein, the impedance detector can be connected by a further interface of the microphone arrangement to a peripheral device that uses an impedance-coded data format; and
    wherein the interface control unit can perform format conversions between a protocol for serial data transmission to the external device and the impedance-coded data format of the peripheral device connected to the impedance detector.

8. The microphone arrangement according to claim 1, wherein the digital interface is USB, I2C, SPI, I2S or Slimbus.

9. The microphone arrangement according to claim 1, wherein the analog-to-digital converter comprises a sigma-delta converter.

10. The microphone arrangement according to claim 1, wherein the transducer, the analog-to-digital converter and/or the interface control unit are monolithically integrated on a chip.

11. The microphone arrangement according to claim 1, further comprising:
    an impedance detector, a digital-to-analog converter, a preamplifier and/or an amplifier, wherein the impedance detector, the digital-to-analog converter, the amplifier, the preamplifier and/or the analog-to-digital converter are monolithically integrated on a chip.

12. The microphone arrangement according to claim 1, further comprising:
    a second transducer for converting received sound waves into electrical signals and a second analog-to-digital converter, wherein the second transducer is coupled to the interface control unit by the second analog-to-digital converter.

13. The microphone arrangement according to claim 1, wherein the transducer comprises a MEMS structure.

14. The microphone arrangement according to claim 1, wherein the microphone arrangement is incorporated in the external device.

15. The microphone arrangement according to claim 1, wherein the transducer and the analog-to-digital converter are integrated in the SMD housing, and wherein an integrated circuit includes the interface control unit and the at least one further interface, wherein the integrated circuit is integrated in a housing and the integrated circuit and the SMD housing are connected by an interface.

16. The microphone arrangement according to claim 15, wherein the interface between the integrated circuit and the SMD housing is designed for signals coded using pulse density modulation.

17. An integrated circuit for use in a microphone arrangement according to claim 14, comprising an interface control unit with a digital interface that can be used to transmit data serially to the external device, and having at least one further interface to which peripheral devices can be connected such that the at least one further interface can be used to transmit data between the peripheral devices and the interface control unit.

18. A microphone arrangement, comprising:
an SMD housing;
a sound inlet opening;
a transducer that receives sound waves through the sound inlet opening and produces electrical signals that correspond to the received sound waves;
an analog-to-digital converter for providing digital signals;
an interface control unit with a digital interface that can be used to transmit data serially to an external device; and
at least one further interface to which a peripheral device can be connected such that the at least one further interface can be used to transmit data between peripheral devices and the interface control unit,
wherein the transducer, the analog-to-digital converter, the interface control unit and the at least one further interface are integrated in the SMD housing, wherein the microphone arrangement and the peripheral device are configured to transmit data to the external device serially and/or wherein the external device is configured to transmit data to the microphone arrangement and to the peripheral device serially, wherein the microphone arrangement is configured such that if data are transmitted from the external device to the peripheral device, the data are first of all forwarded to the interface control unit by means of the digital interface and the interface control unit routes the data via the further interface to the peripheral device.

19. A microphone arrangement, comprising:
a first SMD housing;
a second SMD housing;
a sound inlet opening;
a transducer that receives sound waves through the sound inlet opening and produces electrical signals that correspond to the received sound waves;
an analog-to-digital converter for providing digital signals;
an interface control unit with a digital interface that can be used to transmit data serially to an external device; and
at least one further interface to which a peripheral device can be connected such that the at least one further interface can be used to transmit data between peripheral devices and the interface control unit,
wherein the transducer and the analog-to-digital converter are integrated in the first SMD housing and the interface control unit and the at least one further interface are integrated in the second SMD housing, wherein the microphone arrangement and the peripheral device are configured to transmit data to the external device serially and/or wherein the external device is configured to transmit data to the microphone arrangement and to the peripheral device serially, wherein the microphone arrangement is configured such that if data are transmitted from the external device to the peripheral device, the data are first of all forwarded to the interface control unit by means of the digital interface and the interface control unit routes the data via the further interface to the peripheral device.

20. A microphone arrangement, comprising:
an SMD housing;
a sound inlet opening;
a transducer that receives sound waves through the sound inlet opening and produces electrical signals that correspond to the received sound waves;
an analog-to-digital converter for providing digital signals;
an interface control unit with a digital interface that can be used to transmit data serially to an external device;
at least one further interface to which a peripheral device can be connected such that the at least one further interface can be used to transmit data between peripheral devices and the interface control unit,
wherein the transducer, the analog-to-digital converter, the interface control unit and the at least one further interface are integrated in the SMD housing, or
wherein the transducer and the analog-to-digital converter are integrated in the SMD housing and the interface control unit and the at least one further interface are integrated in a second SMD housing; and
an impedance detector, a digital-to-analog converter, a preamplifier and/or an amplifier, wherein the impedance detector, the digital-to-analog converter, the amplifier, the preamplifier and/or the analog-to-digital converter are monolithically integrated on a chip.

21. The microphone arrangement according to claim 1, wherein the microphone arrangement is configured to be connected simultaneously to a plurality of peripheral devices.

* * * * *